US010920742B2

(12) United States Patent
Lin et al.

(10) Patent No.: US 10,920,742 B2
(45) Date of Patent: Feb. 16, 2021

(54) NOISE-REDUCTION DEVICE FOR WIND TURBINE AND THE WIND TURBINE APPLIED THEREOF

(71) Applicant: INSTITUTE OF NUCLEAR ENNERGY RESEARCH, ATOMIC ENERGY COUNCIL, EXECUTIVE YUAN, R.O.C., Taoyuan (TW)

(72) Inventors: Yan-Ting Lin, Taoyuan (TW); Guan-Ting Lin, Taoyuan (TW); En-Kai Cheng, Taoyuan (TW); Chin-Cheng Huang, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 152 days.

(21) Appl. No.: 16/046,132

(22) Filed: Jul. 26, 2018

(65) Prior Publication Data
US 2020/0032768 A1    Jan. 30, 2020

(51) Int. Cl.
*F03D 1/06* (2006.01)

(52) U.S. Cl.
CPC ........ *F03D 1/0633* (2013.01); *F05B 2200/20* (2013.01); *F05B 2220/30* (2013.01); *F05B 2240/221* (2013.01); *F05B 2240/30* (2013.01); *F05B 2250/231* (2013.01); *F05B 2250/232* (2013.01); *F05B 2250/241* (2013.01); *F05B 2260/96* (2013.01)

(58) Field of Classification Search
CPC .. F03D 1/0633; F03D 7/0296; F05B 2220/20; F05B 2220/30; F05B 2240/221; F05B 2240/30; F05B 2250/231; F05B 2250/232; F05B 2250/241; F05B 2260/96
See application file for complete search history.

(56) References Cited

U.S. PATENT DOCUMENTS

| 4,227,665 | A * | 10/1980 | Carlson ..................... B64C 3/58 244/17.11 |
| 7,900,871 | B2 * | 3/2011 | Rincker ................. B64C 23/06 244/134 A |
| 8,047,801 | B2 * | 11/2011 | Fang ..................... F03D 1/0633 416/235 |
| 8,602,739 | B2 * | 12/2013 | Enevoldsen .......... F03D 1/0641 416/223 R |

(Continued)

*Primary Examiner* — Christopher Verdier
*Assistant Examiner* — Theodore C Ribadeneyra
(74) *Attorney, Agent, or Firm* — Schmeiser, Olsen & Watts, LLP

(57) ABSTRACT

A noise-reduction device for a wind turbine and the wind turbine applied thereof are introduced. The noise-reduction device has a body. The body has a connection portion and a spoiler. The connection portion is concavely disposed on one side of the body and corresponds in shape to the wind turbine's blade so as to be fixed to a confronting edge of the wind turbine blade. The spoiler is disposed on the opposing side of the body. As soon as the wind turbine blade is driven by wind, the spoiler stirs air and guides the air across two sides thereof. When guided by the spoiler, airflows turn into vortexes on the wind turbine blade; hence, the chance that the wind turbine will stall and generate noise is greatly reduced.

9 Claims, 7 Drawing Sheets

(56) References Cited

U.S. PATENT DOCUMENTS

| | | | |
|---|---|---|---|
| 2009/0068018 A1* | 3/2009 | Corten | F03D 1/0633 416/223 R |
| 2009/0285682 A1* | 11/2009 | Baker | F03D 1/0675 416/1 |
| 2010/0143152 A1* | 6/2010 | Subramanian | F03D 1/0608 416/90 R |
| 2011/0008174 A1* | 1/2011 | Ireland | B64C 23/065 416/223 R |
| 2012/0070281 A1* | 3/2012 | Fuglsang | F03D 7/0224 416/1 |
| 2012/0141271 A1* | 6/2012 | Southwick | F03D 1/0633 416/23 |
| 2012/0308396 A1* | 12/2012 | Hibbard | F03D 1/0675 416/241 R |
| 2013/0037657 A1* | 2/2013 | Breidenthal | F04D 27/0207 244/204.1 |
| 2013/0259689 A1* | 10/2013 | Eisenberg | F03D 1/0633 416/23 |
| 2014/0186188 A1* | 7/2014 | Takeuchi | F03D 1/0675 416/224 |
| 2014/0328687 A1* | 11/2014 | Tobin | F03D 1/0633 416/174 |
| 2015/0098820 A1* | 4/2015 | Dixon | F03D 1/0633 416/1 |
| 2015/0204306 A1* | 7/2015 | Herr | B64C 23/06 416/23 |
| 2016/0215758 A1* | 7/2016 | Corten | B64C 23/06 |
| 2017/0284362 A1* | 10/2017 | Enevoldsen | F03D 7/0296 |
| 2018/0057141 A1* | 3/2018 | Shormann | B64C 11/18 |
| 2018/0106237 A1* | 4/2018 | Tobin | F03D 13/10 |
| 2018/0202417 A1* | 7/2018 | Fukami | F03D 1/0691 |
| 2018/0209398 A1* | 7/2018 | Wetzel | F03D 1/0633 |
| 2018/0216600 A1* | 8/2018 | Zamora Rodriguez | F03D 1/0633 |
| 2019/0162171 A1* | 5/2019 | Jensen | F03D 80/30 |
| 2019/0338749 A1* | 11/2019 | Malpede | F03D 1/0633 |

* cited by examiner

NOISE-REDUCTION DEVICE FOR WIND TURBINE AND THE WIND TURBINE APPLIED THEREOF

TECHNICAL FIELD

The present disclosure relates to noise-reduction devices for a wind turbine and the wind turbine applied thereof and, more particularly, to a noise-reduction device for a wind turbine and the wind turbine applied thereof, with a turbulence mechanism disposed on wind turbine blades.

RELATED ART

In general, wind turbines are devices built outdoors to convert the wind's kinetic energy into electrical energy. The wind causes wind turbine blades to rotate. An angle of attack is the angle between the chord line of a wind turbine blade and the oncoming flow of wind. If the angle of attack is too large, the oncoming air flow above the blade will be quick and turbulent, causing the wind turbine to stall.

As soon as the wind turbine stalls, not only do its blades stop rotating suddenly to the detriment of power generation efficiency, but the abrupt change in the rotation speed of the blades also leads to a shortened service life of gear trains and transmissions. Furthermore, the stall is accompanied by the occurrence of massive turbulent air flow. When hit by the massive turbulent air flow, the blades generate noise.

In an attempt to preclude the stall, wind turbine manufacturers gave conventional wind turbine blades new appearance, that is, irregular shapes. The irregularly shaped blades are conducive to generation of vortexes on their surfaces. The vortexes are effective in preventing a stall even in the event of a large angle of attack. However, the manufacturers' attempt gets stuck initially, and simply, in the stage of research and development. Moreover, the manufacturers' attempt faces another challenge: not only do the manufacturers consider the irregularly shaped blades difficult to manufacture, but technicians also find few options/substitutes to repair/change the irregularly shaped blades.

SUMMARY

To overcome the aforesaid drawbacks of the prior art, the present disclosure provides a noise-reduction device for a wind turbine and the wind turbine applied thereof. The noise-reduction device is fixed to a confronting edge of the wind turbine blade to effectively reduce the chance that airflows arriving at the wind turbine blade will become turbulent. Furthermore, the present disclosure dispenses with the need to reshape conventional wind turbine blades and thus strikes a balance between manufacturing costs and flexibility in repairs and changes.

An embodiment of the present disclosure provides a noise-reduction device for a wind turbine, applicable to wind turbine blades. The noise-reduction device for a wind turbine comprises a body. The body comprises a connection portion and a spoiler. The connection portion is concavely disposed on a side of the body and corresponds in shape to the wind turbine blade so as to be fixed to a confronting edge of the wind turbine blade. The spoiler is disposed on an opposing side of the body, as soon as the wind turbine blade is driven by wind, the spoiler stirs air and guides the air across two sides thereof.

The noise-reduction device for a wind turbine is fixed to the wind turbine blade by an industrial adhesive or lock. Hence, the noise-reduction device for a wind turbine can be flexibly mounted and replaced. Another advantage of this embodiment is: the noise-reduction device for a wind turbine is mounted at a confronting edge of the wind turbine blade, and the connection portion corresponds in shape to the wind turbine blade; hence, it is feasible to mount the noise-reduction device for a wind turbine on the confronting edge by confirming its position thereon rather than correcting its two other directions.

In an embodiment, the spoiler is spherical, cylindrical or conical. The spoiler disturbs wind and thus turns it into vortexes. The shape of the spoiler depends on that of the wind turbine blades; hence, the shape of the spoiler is subject to changes.

The present disclosure further provides a wind turbine. The wind turbine comprises a rotating shaft, a plurality of wind turbine blades and a plurality of aforesaid noise-reduction devices. The wind turbine blades each have a pivotal end (positioned proximate to the rotating shaft) connected to the rotating shaft. The plurality of noise-reduction devices is disposed at the confronting edge of each wind turbine blade.

The advantages of the wind turbine are identical to those of the noise-reduction device and thus are, for the sake of brevity, not described herein.

In an embodiment, the spoiler is spherical, cylindrical or conical, but the present disclosure is not limited thereto.

In an embodiment, the noise-reduction devices disposed at the confronting edge of each wind turbine blade are spaced apart by the same distance. Alternatively, the noise-reduction devices disposed at the confronting edge of each wind turbine blade are spaced apart by a distance, but the distance varies and decreases from the pivotal end to a free end of the wind turbine blade.

The decrease in the distance grows according to Fibonacci sequence.

Surface areas of the spoilers decrease from the pivotal end to the free end of the wind turbine blade. For example, the decrease in the surface areas of the spoilers grows according to Fibonacci sequence. In this embodiment, the noise-reduction devices disposed at the confronting edge of each wind turbine blade are spaced apart by the same distance or different distances.

DETAILED DESCRIPTION OF THE PREFERRED EMBODIMENTS

Objectives, features, and advantages of the present disclosure are hereunder illustrated with specific embodiments, depicted by the accompanying drawings, and described in detail below.

Figure 1A:
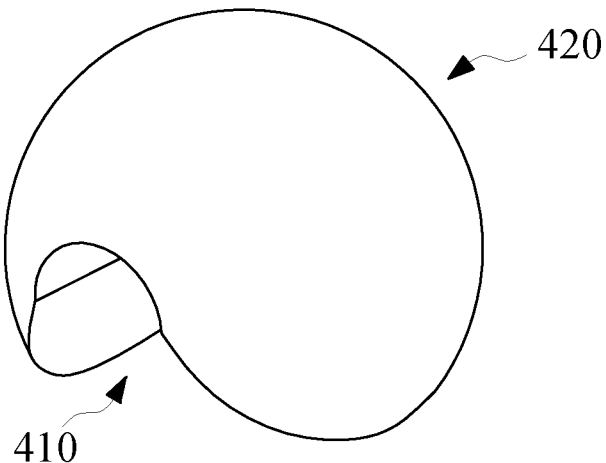
FIG. 1A is a perspective view of a noise-reduction device for a wind turbine according to an embodiment of the present disclosure.
Figure 1B:
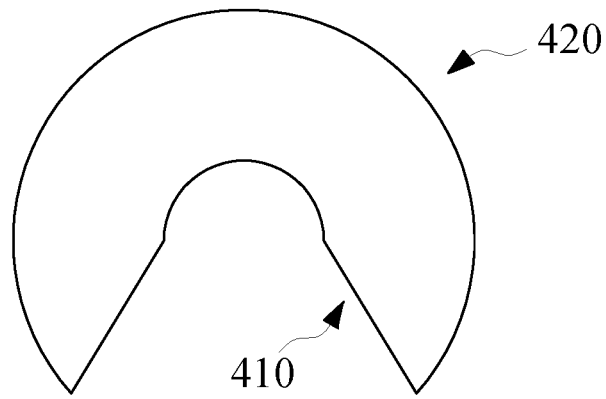
FIG. 1B is a lateral view of the noise-reduction device.
Figure 2A:
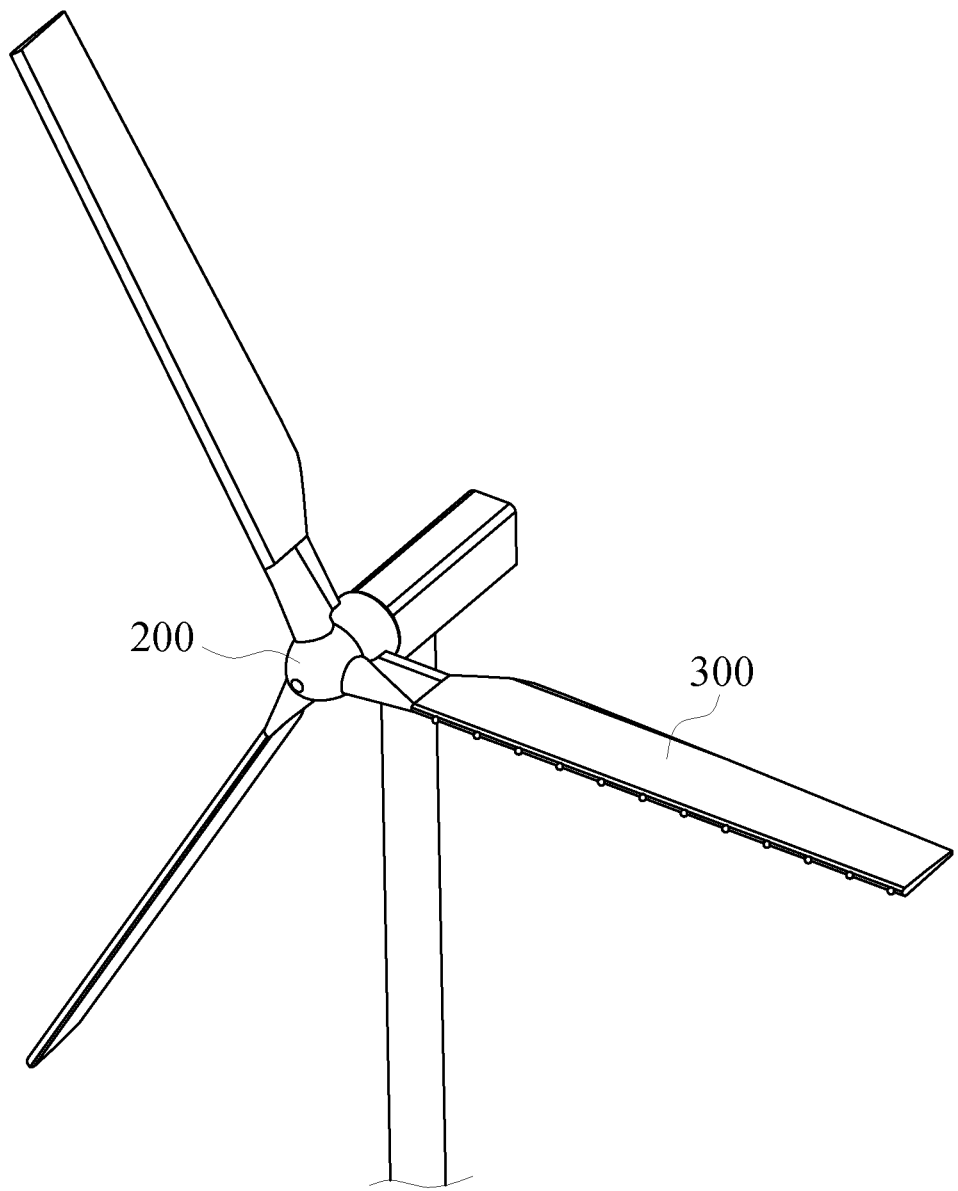
FIG. 2A is a schematic view of a wind turbine according to an embodiment of the present disclosure.

Referring to FIG. 1A, FIG. 1B and FIG. 2A, a noise-reduction device 400 for a wind turbine comprises a body. The body comprises a connection portion 410 and a spoiler 420. The connection portion 410 is concavely disposed on one side of the body and corresponds in shape to a wind turbine blade 300 of the wind turbine, so as to be fixed to a confronting edge C of the wind turbine blade 300. The connection portion 410 is fixed to the wind turbine blade 300 by an industrial adhesive or lock. Considering that the shapes of the wind turbine blades 300 are subject to changes, embodiments and diagrams of the connection portion 410 according to the present disclosure only serve illustrative, rather than restrictive, purposes.

The noise-reduction device 400 for a wind turbine is mounted on one or all of the wind turbine blades 300 of the wind turbine. Referring to FIG. 2A, a wind turbine 100 comprises a rotating shaft 200, a plurality of wind turbine blades 300 and a plurality of noise-reduction devices 400. The wind turbine blades 300 are mounted on and thus driven by the rotating shaft 200.

Figure 2B:
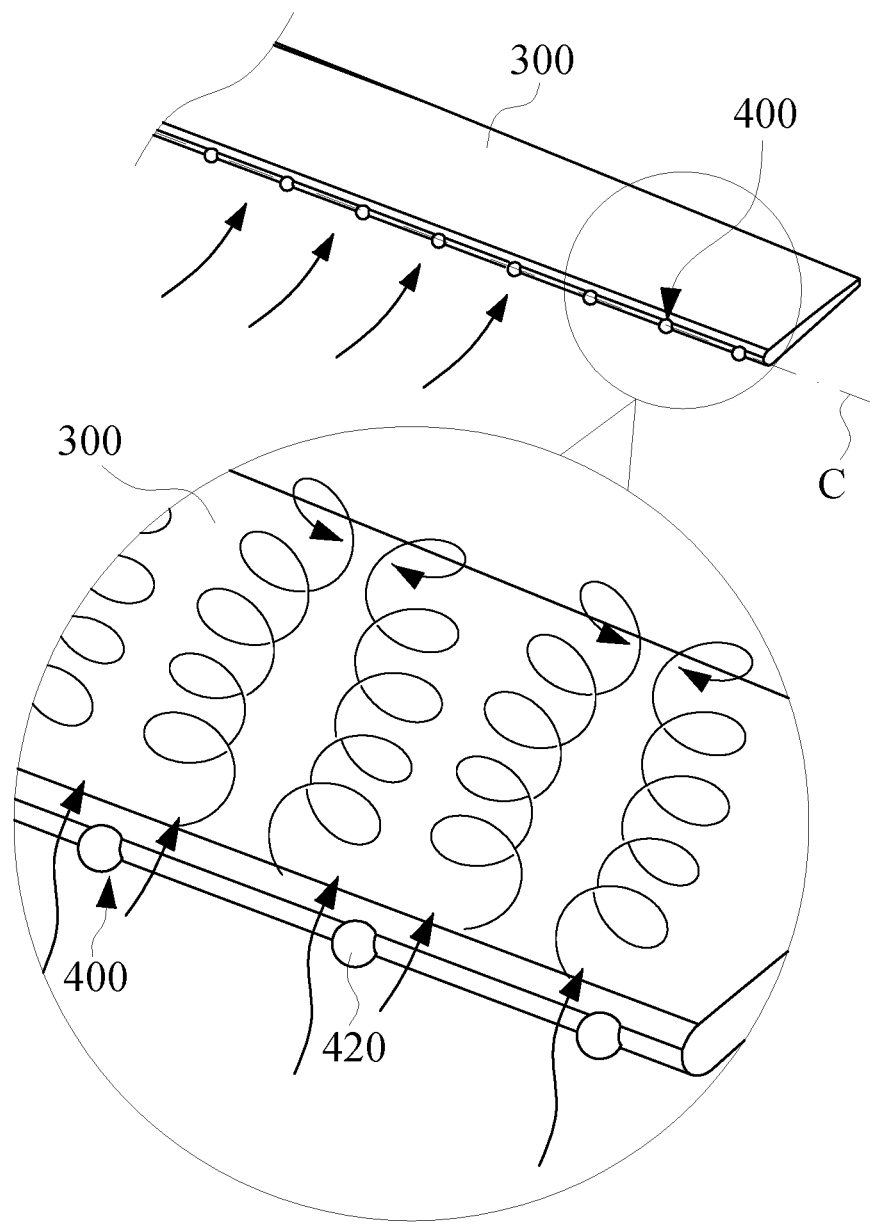
FIG. 2B is a schematic view of how airflows hitting wind turbine blades which the noise-reduction devices are mounted on become turbulent.

Referring to FIG. 2B, the spoiler 420 of each noise-reduction device 400 for a wind turbine is disposed on the opposing side of the body of the noise-reduction device 400. After arriving at the wind turbine blades 300 and thus hitting the spoilers 420, airflows become turbulent and thus turn into spiral vortexes.

Conventional wind turbines have flat blades. The flat blades are incapable of guiding any airflows. Airflows passing the blades turn turbulent in no time at all. As a result, pressure on the windy sides of the blades decreases, adding to the drag on the rotation of the blades and thereby causing the wind turbines to stall.

In this embodiment of the present disclosure, as soon as the wind turbine blades 300 are driven by wind, the spoiler 420 stirs air and guides the air across two sides thereof. With the wind turbine blades 300 rotating, the air stirred up turns into spiral vortexes. The spiral vortexes have slower movement across and thus longer stay on the surfaces of the wind turbine blades 300 than the aforesaid turbulent airflows; hence, the spiral vortexes are conducive to stabilization of air pressure on the wind turbine blades 300. Therefore, the chance that the wind turbine 100 will stall and generate noise is greatly reduced.

With stalls being unlikely to happen to the wind turbine 100, the wind turbine 100 is capable of stable operation, has a long service life, and has high efficiency in power generation.

Figure 3A:
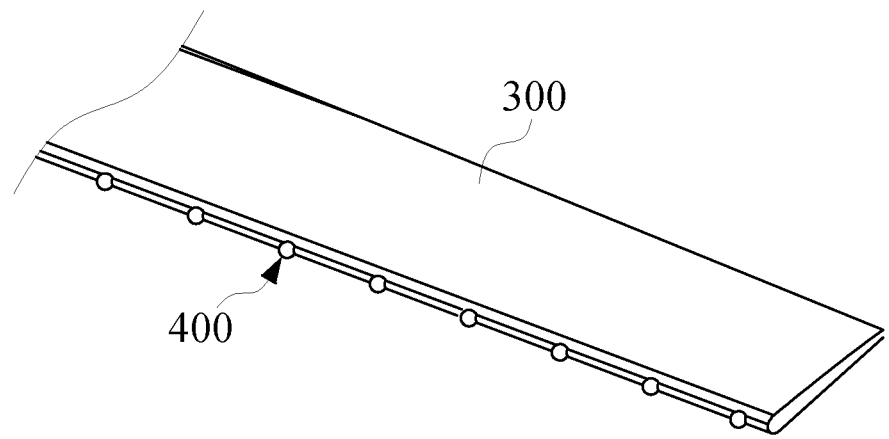
FIG. 3A is a schematic view of the noise-reduction devices spaced apart by the same distance.
Figure 3B:
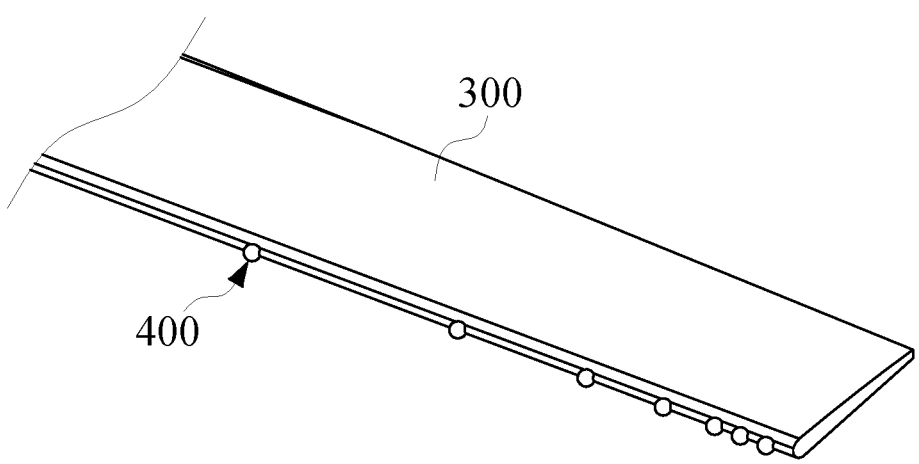
FIG. 3B is a schematic view of the noise-reduction devices spaced apart by a distance decreasing toward the free end of the wind turbine blade.

Referring to FIG. 3A and FIG. 3B, the noise-reduction devices 400 disposed at the confronting edge C of each wind turbine blade 300 are spaced apart by the same distance or different distances. For instance, the distances decrease from the pivotal end (positioned proximate to the rotating shaft 200) to the free end of each wind turbine blade 300.

Figure 4A:
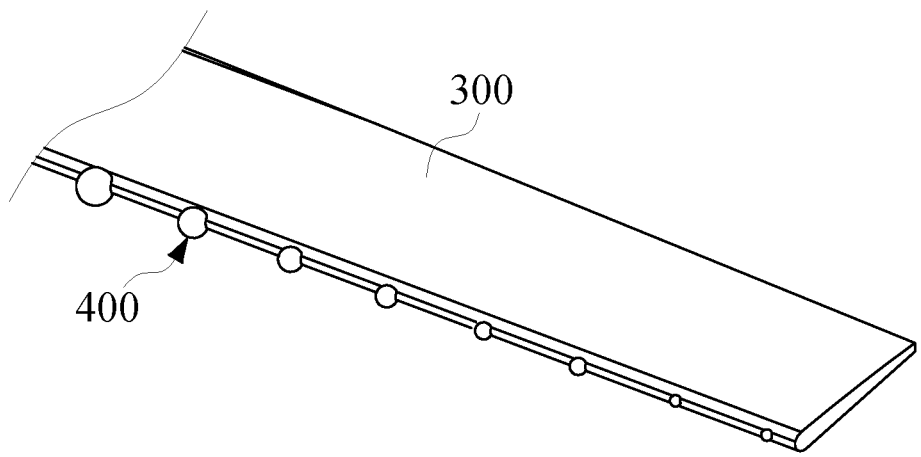
FIG. 4A is a schematic view of the noise-reduction devices with respective surface areas decreasing toward the free end of the wind turbine blade.
Figure 4B:
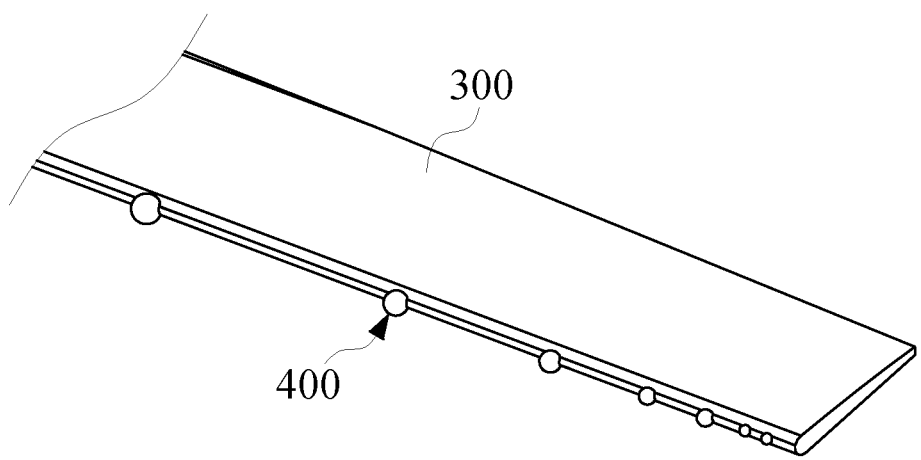
FIG. 4B is a schematic view of the noise-reduction devices with respective surface areas and intervening distances, both decreasing toward the free end of the wind turbine blade.

Referring to FIG. 4A and FIG. 4B, surface areas of the spoilers 420 decrease from the pivotal end to the free end of each wind turbine blade 300. Both the decrease in distances and the decrease in surface areas grow according to Fibonacci sequence.

The aforesaid embodiments embody the fin-related structure of large whales. Nodes which come in different sizes and separate by different distances are found in large whales' fins. The nodes provide greater buoyancy to the whales to prevent a stall otherwise resulting from large-angle swings of the fins.

In the aforesaid embodiments, sizes and intervening distances of the noise-reduction devices 400 simulate those of the whales' fins to further enhance the operation efficiency of the wind turbine 100.

Figure 5A:
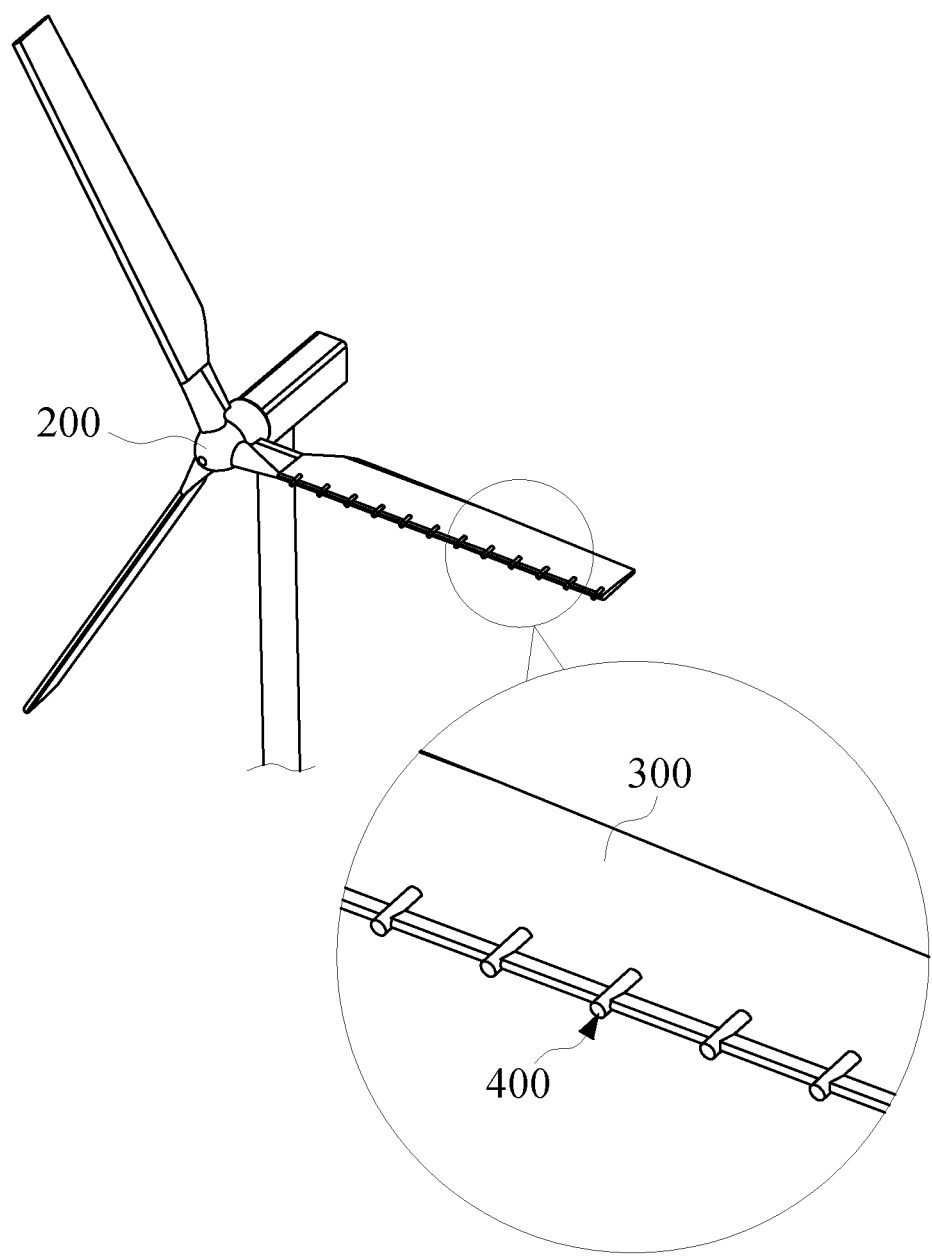
FIG. 5A is a schematic view of the noise-reduction devices in another shape according to the present disclosure.
Figure 5B:
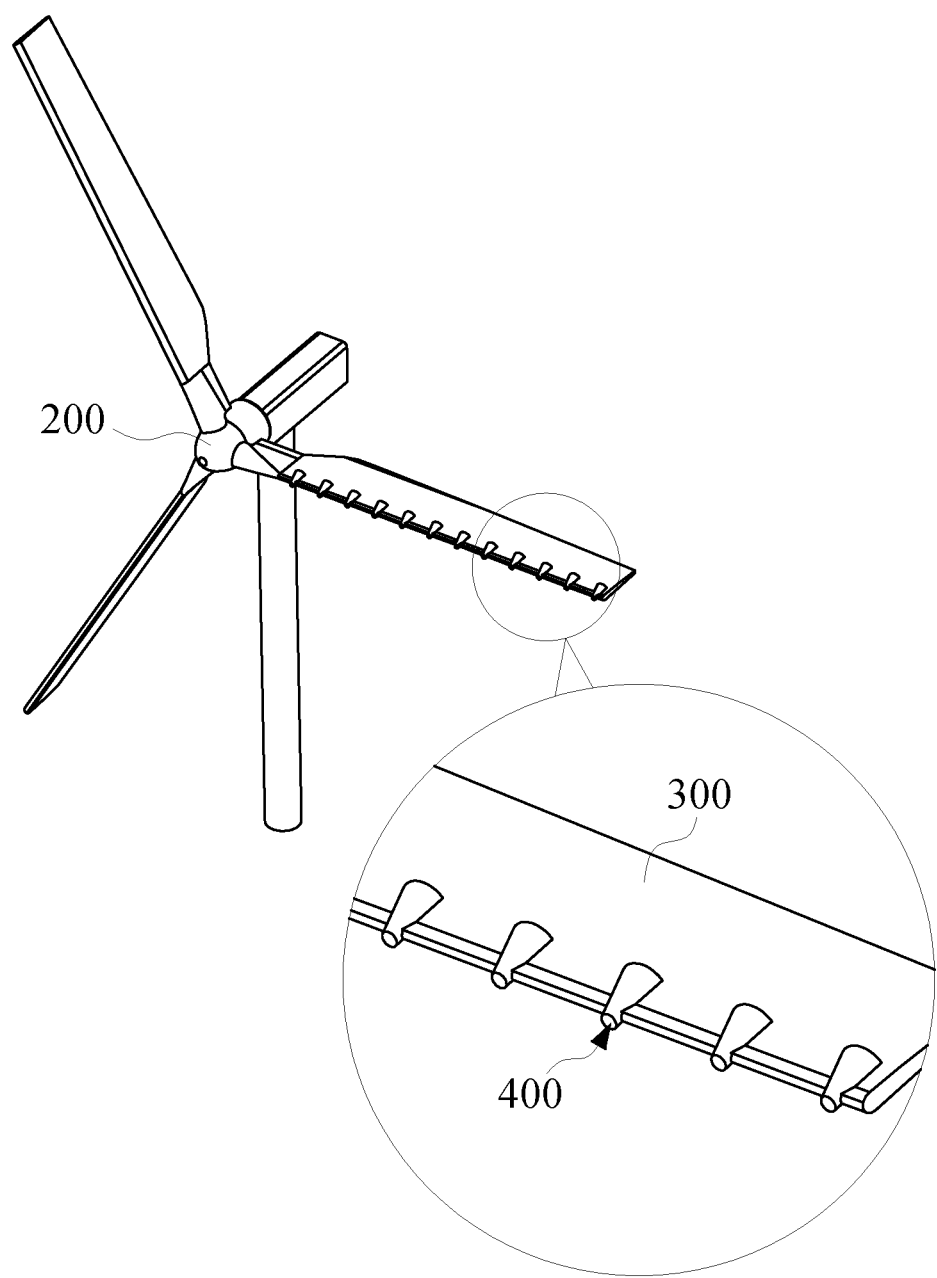
FIG. 5B is a schematic view of the noise-reduction devices in yet another shape according to the present disclosure.

Referring to FIG. 5A and FIG. 5B, in addition to being spherical, the noise-reduction devices 400 for a wind turbine is cylindrical as shown in FIG. 5A or conical as shown in FIG. 5B. The noise-reduction devices 400 is of a shape corresponding to the wind turbine blades 300. Alternatively, the noise-reduction devices 400 are arranged on the wind turbine blades 300 differently. Hence, in another embodiment, the noise-reduction devices 400 come in different shapes.

In the aforesaid embodiments of the present disclosure, the noise-reduction devices are mounted at the confronting edges of the blades of the wind turbine in such a manner that airflows are guided and thus form vortexes on the surfaces of the blades to preclude stalls and prevent generation of noise. Furthermore, the wind turbine is capable of stable operation, so as to enhance the efficiency of power generation.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent modifications and replacements made to the aforesaid embodiments shall fall within the scope of the present disclosure. Accordingly, the legal protection for the present disclosure shall be defined by the appended claims.

What is claimed is:

1. A noise-reduction device for a wind turbine, the noise-reduction device being applied to a wind turbine blade, the noise-reduction device comprising:
    a body comprising:
    a connection portion concavely disposed on a side of the body and corresponding in shape to the wind turbine blade so as to be fixed to a confronting edge of the wind turbine blade; and
    a spoiler disposed on an opposing side of the body, wherein, as soon as the wind turbine blade is driven by wind, the spoiler stirs air and guides the air across two sides thereof;
    wherein the spoiler is spherical, cylindrical or conical.

2. A wind turbine, comprising:
    a rotating shaft;
    a plurality of wind turbine blades each having a pivotal end connected to the rotating shaft; and
    a plurality of noise-reduction devices of claim 1, wherein the plurality of noise-reduction devices are disposed at a confronting edge of each said wind turbine blade, the noise-reduction devices disposed at the confronting edge of each said wind turbine blade are spaced apart by the same distance.

3. A wind turbine, comprising:
a rotating shaft;
a plurality of wind turbine blades each having a pivotal end connected to the rotating shaft; and
a plurality of noise-reduction devices of claim 1,
wherein the plurality of noise-reduction devices is disposed at a confronting edge of each said wind turbine blade; and the spoilers are spherical, cylindrical, or conical.

4. The wind turbine of claim 3, wherein the noise-reduction devices disposed at the confronting edge of each said wind turbine blade are spaced apart by the same distance.

5. The wind turbine of claim 3, wherein the noise-reduction devices disposed at the confronting edge of each said wind turbine blade are spaced apart by distances being different and decreasing from the pivotal end to a free end of the wind turbine blade.

6. The wind turbine of claim 5, wherein the decrease in the distances grows according to Fibonacci sequence.

7. The wind turbine of claim 3, wherein surface areas of the spoilers decrease from the pivotal end to a free end of the wind turbine blade.

8. The wind turbine of claim 7, wherein the decrease in surface areas of the spoilers grows according to Fibonacci sequence.

9. The wind turbine of claim 7, wherein the noise-reduction devices disposed at the confronting edge of each said wind turbine blade are spaced apart by different distances.

\* \* \* \* \*